(12) United States Patent
Yang (10) Patent No.: US 10,443,914 B2
(45) Date of Patent: Oct. 15, 2019

(54) ICE-MAKING DEVICE FOR REFRIGERATOR

(71) Applicant: Dongbu Daewoo Electronics Corporation, Seoul (KR)

(72) Inventor: Sung Jin Yang, Seoul (KR)

(73) Assignee: DONGBU DAEWOO ELECTRONICS CORPORATION, Seoul (KR)

(*) Notice: Subject to any disclaimer, the term of this patent is extended or adjusted under 35 U.S.C. 154(b) by 58 days.

(21) Appl. No.: 15/465,099

(22) Filed: Mar. 21, 2017

(65) Prior Publication Data

US 2017/0292747 A1 Oct. 12, 2017

(30) Foreign Application Priority Data

Apr. 8, 2016 (KR) .................. 10-2016-0043650

(51) Int. Cl.
| | |
|---|---|
| F25C 1/04 | (2018.01) |
| F25C 5/18 | (2018.01) |
| F25C 5/08 | (2006.01) |
| F25C 1/24 | (2018.01) |
| F25D 17/06 | (2006.01) |
| F25C 5/182 | (2018.01) |

(52) U.S. Cl.
CPC .................. *F25C 1/04* (2013.01); *F25C 1/24* (2013.01); *F25D 17/065* (2013.01); *F25C 5/08* (2013.01); *F25C 5/182* (2013.01); *F25D 2317/061* (2013.01); *F25D 2317/063* (2013.01); *F25D 2317/067* (2013.01); *Y02P 60/855* (2015.11)

(58) Field of Classification Search
CPC .. F25C 1/04; F25C 1/24; F25D 17/065; F25D 2317/063
See application file for complete search history.

(56) References Cited

U.S. PATENT DOCUMENTS

| | | | | |
|---|---|---|---|---|
| 1,997,416 | A * | 4/1935 | Grover | F25C 1/24 |
| | | | | 254/131 |
| 3,952,539 | A * | 4/1976 | Hanson | F25C 1/04 |
| | | | | 62/351 |
| 9,857,121 | B2 * | 1/2018 | Yang | F25C 5/08 |
| 2008/0034780 | A1 | 2/2008 | Lim et al. | |
| 2008/0264082 | A1 | 10/2008 | Tikhonov et al. | |
| 2011/0162406 | A1 | 7/2011 | Shin et al. | |
| 2016/0370075 | A1 * | 12/2016 | Yang | F25C 5/08 |

FOREIGN PATENT DOCUMENTS

| | | |
|---|---|---|
| KR | 10-2005-0022967 A | 3/2005 |
| KR | 10-2007-0076993 A | 7/2007 |
| KR | 10-2008-0014598 A | 2/2008 |
| KR | 10-2011-0080104 A | 7/2011 |

* cited by examiner

*Primary Examiner* — Christopher R Zerphey (57) ABSTRACT

An ice-making device for a refrigerator including a duct providing a cold air flow path under an ice tray in which water turns into ice pieces. Uneven portions extending in a direction differing from a flow direction of cold air are formed at a lower surface of the ice tray. The duct may have a wavy surface. The surface features of the ice tray and the duct can advantageously increase contact area and contact time between cold air and the ice tray, thereby increasing the heat exchange efficiency between cold air and water contained in the ice tray.

16 Claims, 6 Drawing Sheets

ICE-MAKING DEVICE FOR REFRIGERATOR

CROSS-REFERENCE TO RELATED APPLICATION

This application is based on and claims priority from Korean Patent Application No. 10-2016-0043650, filed on Apr. 8, 2016, the disclosure of which is incorporated herein in its entirety by reference for all purposes.

TECHNICAL FIELD

The present disclosure relates to refrigerators, and more particularly, to ice making mechanisms in refrigerators.

BACKGROUND

A refrigerator is an appliance for use in storing food at a low temperature and may be configured to store food (or other items) in a frozen state or a refrigerated state depending on types of food to be stored. The inside of the refrigerator is cooled by circulating cold air that can be continuously generated through a heat exchange process by using a refrigerant. During operation, the refrigerant goes through repetitive cycles of compression, condensation, expansion and evaporation in a heat exchanger. The cold air supplied in the refrigerator is uniformly distributed by convection. Accordingly, the items placed in the refrigerator can be stored at a desired low temperature.

The heat exchanger is installed in one side of the refrigerator and is isolated from the storage spaces such as the refrigeration room (or the refrigeration compartment) and the freezer for storing food. For example, compression and condensation processes may be performed by a compressor and a condenser disposed within a machine room located at the lower side of a rear surface of the refrigerator. In an evaporation process, the refrigerant may evaporate and thereby absorb heat from ambient air. As a result, the ambient air is cooled down.

A main body of the refrigerator may have a rectangular parallel-piped shape with an open front surface. Typically, the main body encloses a refrigeration room and freezer, each with its own door. The refrigerator may include a plurality of drawers, shelves, vegetable compartments, etc., for sorting and storing different types of items.

Conventionally, top mount type refrigerators used to be popular, with a freezer located at an upper side and a refrigeration room located at a lower side. Recently, bottom freezer type refrigerators have been developed, where a freezer is located at the lower side. A bottom freezer type refrigerator provides the advantage that a user can conveniently access the refrigerator in general. However, a user often needs to lower down or bend down to access the freezer, e.g., for taking ice from it.

Some bottom freezer type refrigerators have an ice dispenser located at the refrigeration room compartment disposed at the upper side of the refrigerator. An ice-making device for making ice pieces may be disposed on the refrigeration room door or inside refrigeration room. The ice-making device may include an ice-making unit including an ice tray, and an ice storage part (ice bucket) for storing the ice pieces produced in the ice tray.

However, according to the configuration of a conventional ice-making device, cold air flows through the ice tray and then is discharged directly and quickly. Therefore, the heat exchange efficiency between the cold air and the ice tray is poor.

SUMMARY

Embodiments of the present disclosure provide an ice-making device with improved efficiency of heat exchange between an ice tray and a cold air flow supplied to the ice-making device.

According to an embodiment of the present invention, an ice-making device for a refrigerator includes: an ice tray configured to receive water and to make ice pieces; and a duct configured to receive cold air from an evaporator and to allow the cold air to flow under the ice tray. Uneven portions extending in a direction differing from a flow direction of the cold air are formed on a lower surface of the ice tray.

Further, the uneven portions are formed to protrude from an outer surface of the ice tray.

Further, the uneven portions are formed to be depressed from an outer surface of the ice tray.

Further, the ice tray includes partition walls and ice cells divided by the partition walls, and multiple uneven portions are provided in at least some of the ice cells.

Further, the duct has a bottom surface formed in a wavy shape so that the cold air passing through the duct flows up and down.

Further, the ice-making device includes ribs protruding downward from the lower surface of the ice tray. The ribs are formed to extend in a bent shape along the flow direction of the cold air.

Furthermore, according to another embodiment of the present invention, the ice-making device includes a heater unit disposed on an outer surface of the ice tray and configured to heat the ice tray. The duct includes at least two separation walls extending along the flow direction of the cold air. The separation walls are configured to divide the duct into a first space and second spaces disposed at transverse outer sides of the first space. The heater unit is disposed in the second spaces.

Further, each of the separation walls includes a first separation wall and a second separation wall. The first separation wall protrudes downward from the lower surface of the ice tray. The second separation wall protrudes upward from a bottom surface of the duct and is disposed adjacent to the first separation wall.

Further, the second separation wall is disposed inward of the first separation wall and spaced apart from the first separation wall by a predetermined distance. At least a portion of the first separation wall overlaps with the second separation wall in a height direction of the ice tray.

Furthermore, according to another embodiment of the present invention, an ice tray configured to receive water and to make ice pieces; and a duct configured to receive a cold air from an evaporator and to allow the cold air to flow under the ice tray. Uneven portions extending in a direction differing from a flow direction of the cold air are formed in the ice tray. The uneven portions may include depressions from an outer surface of the ice tray.

Further, the ice-making device includes ribs protruding downward from a lower surface of the ice tray. The ribs extend in a bent shape along the flow direction of the cold air.

Further, the ice-making device includes an ice tray configured to receive water and to make ice pieces; and a duct configured to receive cold air from an evaporator and to allow the cold air to flow under the ice tray. Uneven portions extending in a direction different from a flow direction of the cold air are formed on a lower surface of the ice tray. The ice tray includes ice cells divided by partition walls, and multiple uneven portions are provided in at least some of the ice cells.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

One or more exemplary embodiments of the present disclosure will be described more fully hereinafter with reference to the accompanying drawings, in which one or more exemplary embodiments of the disclosure can be easily determined by those skilled in the art. As those skilled in the art will realize, the described exemplary embodiments may be modified in various different ways, all without departing from the spirit or scope of the present disclosure, which is not limited to the exemplary embodiments described herein.

It is noted that the drawings are schematic and are not necessarily dimensionally illustrated. Relative sizes and proportions of parts in the drawings may be exaggerated or reduced in sizes, and a predetermined size is just exemplificative and not limitative. The same reference numerals designate the same structures, elements, or parts illustrated in two or more drawings in order to exhibit similar characteristics.

The exemplary drawings of the present disclosure illustrate ideal exemplary embodiments of the present disclosure in more detail. As a result, various modifications of the drawings are expected. Accordingly, the exemplary embodiments are not limited to a specific form of the illustrated region, and for example, include modification due to manufacturing.

Figure 1:
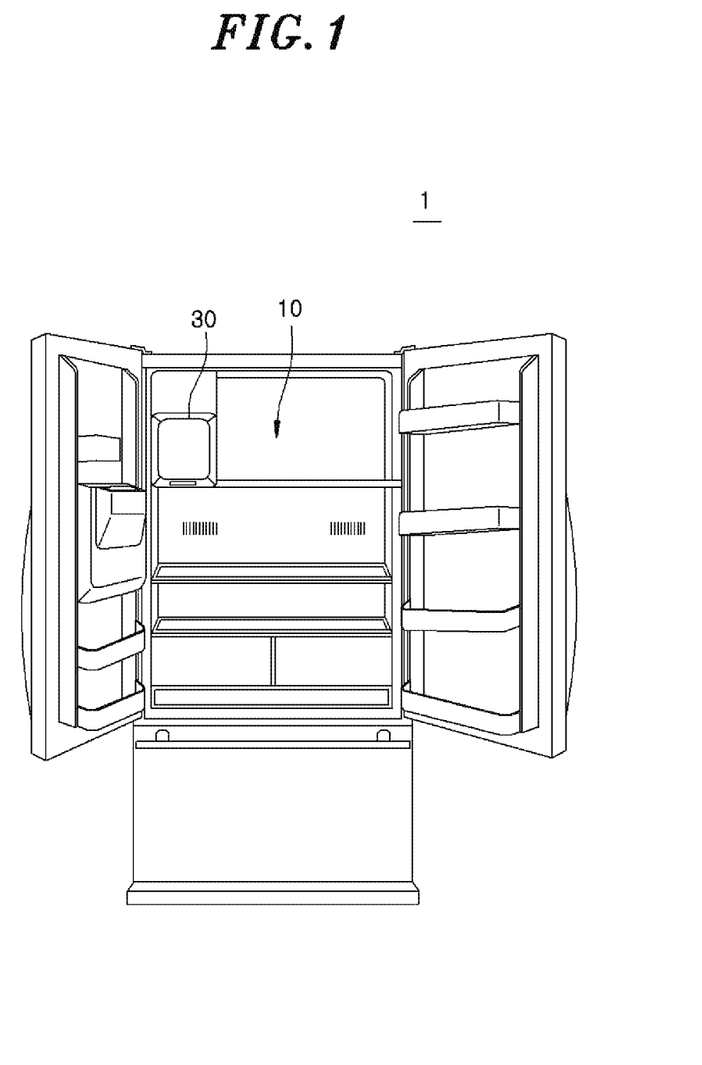
FIG. 1 is a perspective view illustrating the configuration of an exemplary refrigerator equipped with an ice-making device according to one embodiment of the present disclosure.
Figure 2:
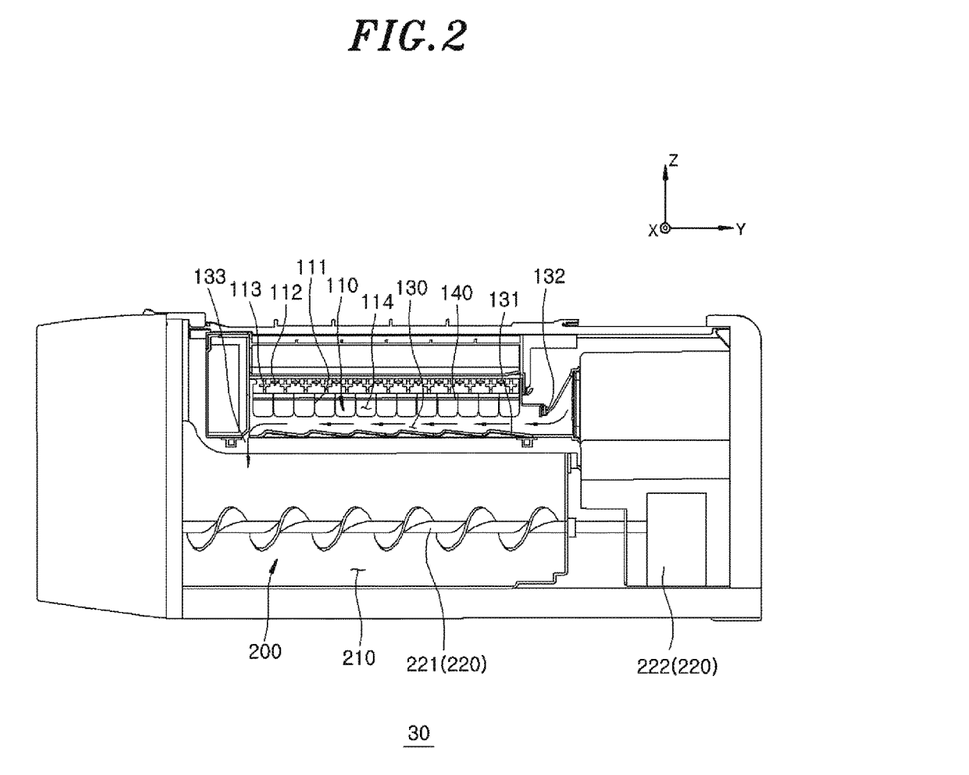
FIG. 2 is a side view illustrating the configuration of the exemplary ice-making device for a refrigerator according to one embodiment of the present disclosure.
Figure 3:
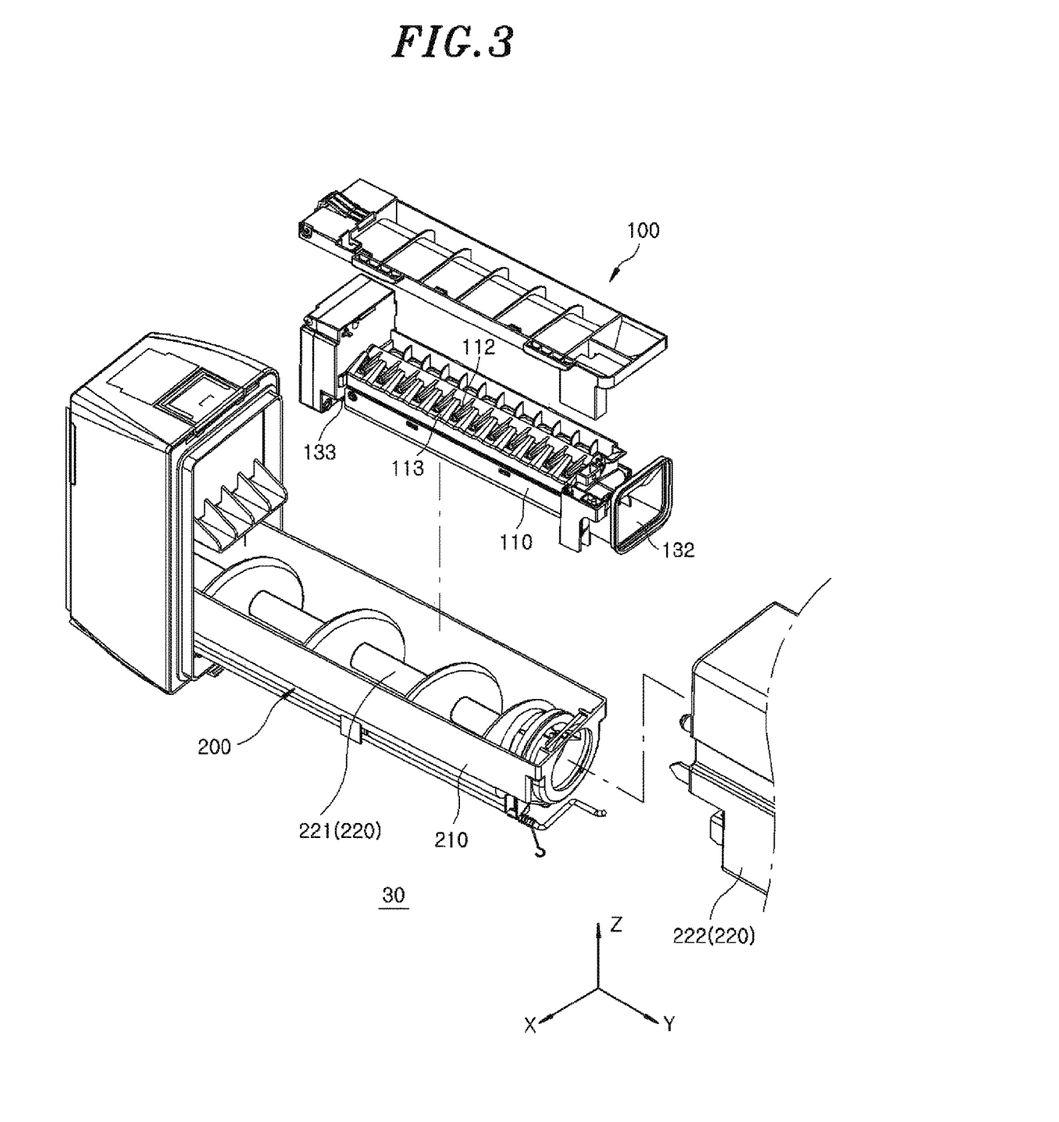
FIG. 3 is an exploded perspective view illustrating the configuration of the exemplary ice-making device in FIG. 2.
Figure 4:
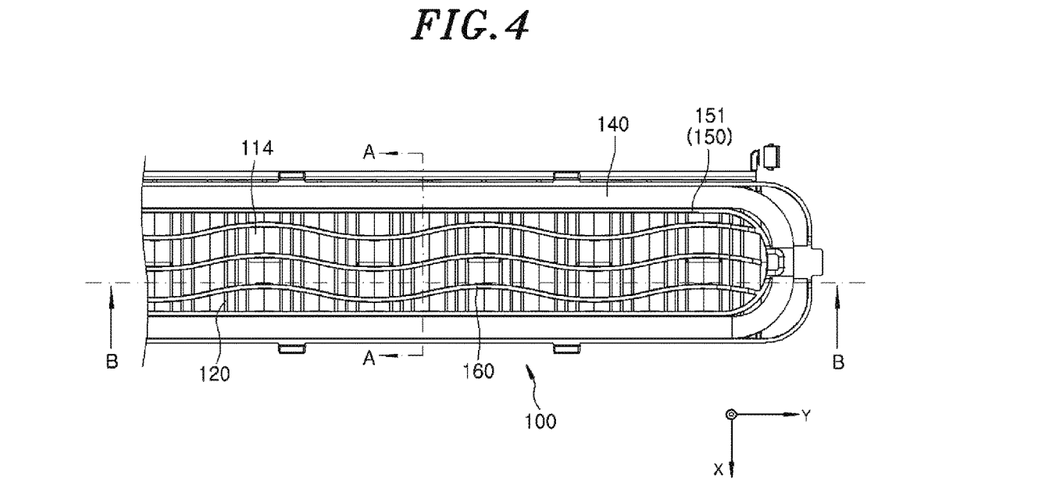
FIG. 4 is a bottom view illustrating the configuration of the exemplary ice-making device FIG. 2.
Figure 5:
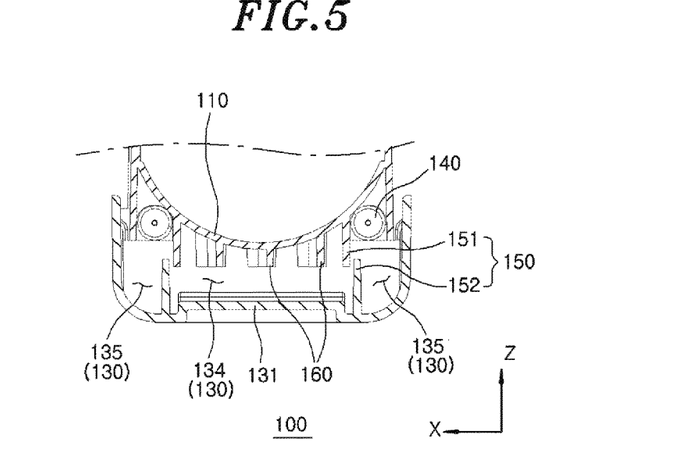
FIG. 5 is a sectional view illustrating the configuration of the exemplary ice-making device taken along line A-A in FIG. 4.
Figure 6:
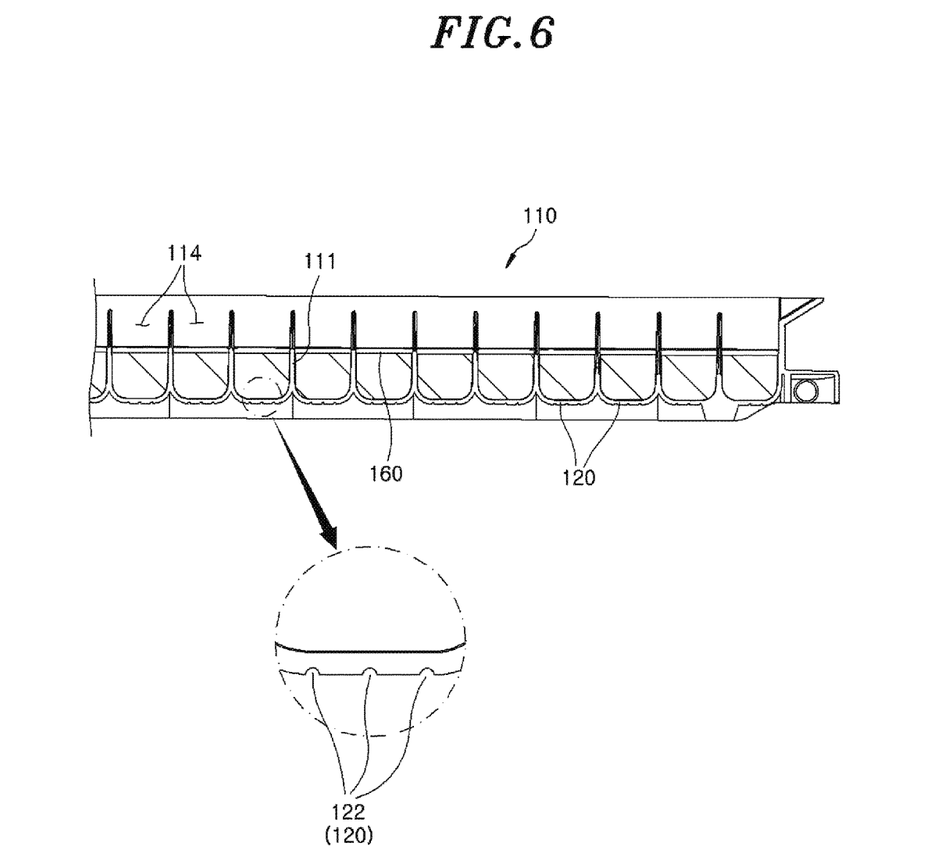
FIG. 6 is a sectional view illustrating one configuration of the exemplary ice-making device taken along line B-B in FIG. 4.
Figure 7:
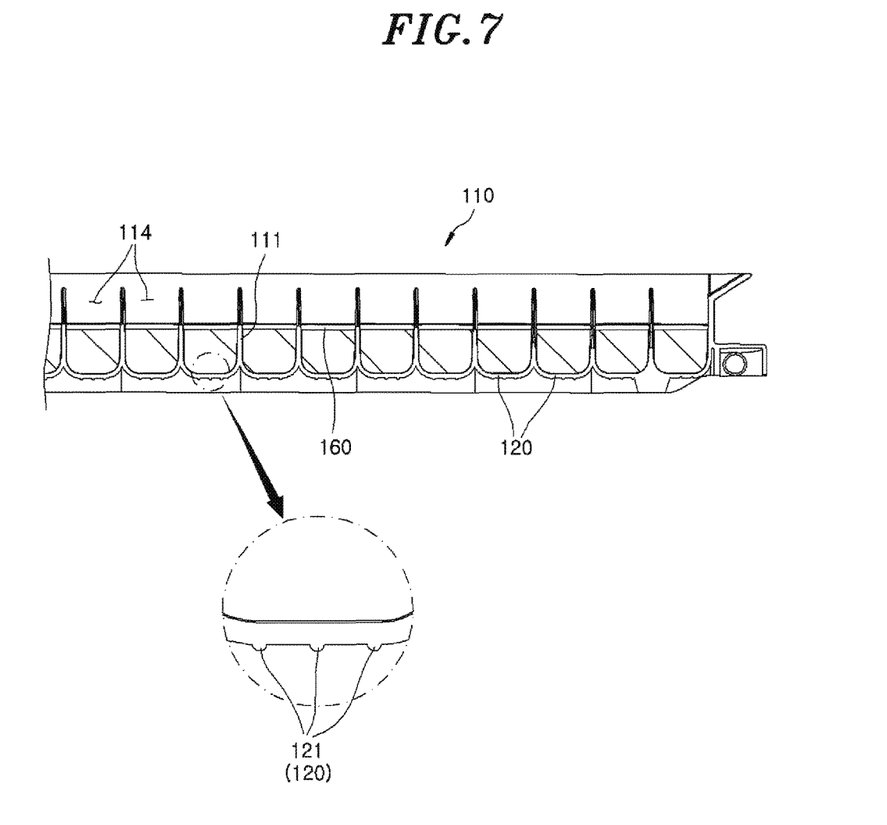
FIG. 7 is a sectional view illustrating another configuration of the exemplary ice-making device for a refrigerator taken along line B-B in FIG. 4.

FIG. 1 is a perspective view illustrating the configuration of an exemplary refrigerator equipped with an ice-making device according to one embodiment of the present disclosure. FIG. 2 is a side view illustrating the configuration of the exemplary ice-making device for a refrigerator according to one embodiment of the present disclosure. FIG. 3 is an exploded perspective view illustrating the configuration of the exemplary ice-making device in FIG. 2. FIG. 4 is a bottom view illustrating the configuration of the exemplary ice-making device FIG. 2. FIG. 5 is a sectional view illustrating the configuration of the exemplary ice-making device taken along line A-A in FIG. 4. FIG. 6 is a sectional view illustrating one configuration of the exemplary ice-making device taken along line B-B in FIG. 4. FIG. 7 is a sectional view illustrating another configuration of the exemplary ice-making device for a refrigerator taken along line B-B in FIG. 4.

Referring to FIGS. 1 to 7, the refrigerator 1 according to one embodiment of the present disclosure may include a refrigerator room 10 and an ice-making device 30.

The refrigerator 1 may include a cooling unit (not shown) configured to generate and supply a cold air flow to the refrigerator room 10. The cooling unit may include, for example, an evaporator, a compressor and a condenser. A refrigerant flows from the evaporator to the compressor. The refrigerant exiting the evaporator usually has a relatively high temperature due to heat exchange with ambient air surrounding the evaporator. The refrigerant is compressed by the compressor and dissipates heat to the outside while passing through the condenser. Thus, the refrigerant is liquefied by the condenser. The liquefied refrigerant passed through the condenser is sent back to the evaporator. At the evaporator, the liquefied refrigerant is evaporated through heat exchange with ambient air and absorbs heat from the air. Thus, the evaporator operates to cool the air in the refrigerator through this heat transfer process. At the same time, liquefied refrigerant in the evaporator is entirely or partially converted into gaseous state. The gaseous refrigerant is then separated from the liquid refrigerant and introduced into the compressor again. Cooled air is then supplied from around the evaporator into the refrigerator room 10, thereby cooling the refrigerator room 10.

The ice-making device 30 for a refrigerator may include an ice-making unit 100 and an ice-storing unit 200.

The ice-making unit 100 may include an ice tray 110, a duct 130 and a heater unit 140.

The ice tray 110 is configured to receive and contain water. The water in the ice tray 110 is cooled into ice pieces by a cold air flow that is generated through a process as described above. The ice tray 110 may include: multiple cells 114 separated by the partition walls 111; an ice-releasing member 112 configured to discharge the ice pieces out of the ice tray 110; and an ice-releasing member guide 113 configured to guide the ice-releasing member 112 and ice cells 114. In different embodiments, the partition walls 111 and the ice cells 114 may have various shapes, and the number of the partition walls 111 and the number of ice cells 114 may also be different.

The ice-releasing member 112 may be configured to be rotated by a drive device such as a motor or any other suitable device. The ice tray 110 may include a heat transfer member made of metal or any other suitable material. The heat transfer member acts to enhance the efficiency of heat exchange between the cold air flowing through the duct 130 and water. The heat transfer member may be disposed outside the ice tray 110 and may have a shape that conforms to the shape of the ice tray 110. However, the present disclosure is not limited thereto.

Uneven portions 120 may be provided on the lower surface of the ice tray 110. The uneven portions 120 may extend in a direction different from the flow direction of the cold air. For example, the cold air may flow along the longitudinal direction of the ice tray 110 and the uneven portions 120 may extend in the transverse direction of the ice tray 110. The uneven portions 120 may have protrusion portions 121 protruding outward from the lower surface of the ice tray 110 or may have recess portions 122 depressed inward from the lower surface of the ice tray 110. In this description, the transverse direction of the ice tray is defined as an X direction in the drawings. Furthermore, the longitudinal direction of the ice tray is defined as a Y direction in the drawings. In this example, cold air flows along the longitudinal direction of the ice tray.

There may be multiple uneven portions 120 arranged side by side along the flow direction of the cold air. Furthermore, there may be multiple uneven portions 120 in each of the ice cells 114. For example, there may be three uneven portions 120 in at least some of the ice cells 114. It will be appreciated that the present disclosure is not limited to any specific type or configuration of uneven portions. For example, the uneven portions 120 may include one or both of the protrusion portions 121 and the recess portions 122.

The duct 130 may be located under the ice tray 110. For example, the duct 130 may be formed by the ice tray 110 and a duct member 131 disposed under the ice tray 110. The duct 130 provides an air flow path and may receive cold air from the cooling unit through an inflow portion 132 of the duct 130. The cold air may be discharged through an outflow portion 133 of the duct 130 after flowing through the ice tray 110. The cold air discharged through the outflow portion 133 may flow toward an ice storage part 210. The lower surface of the duct member 131 may be uneven and may have a wave shape. This enables the cold air to flow up and down while passing through the duct 130, thereby extending the interaction time and the interaction area between the cold air flow and the ice tray.

The heater unit 140 is configured to generate heat and heat the ice tray 110 to melt the portions of the ice pieces in contact with the ice tray 110. This allows the ice pieces to be easily released from the ice tray 110. The heater unit 140 may have a long strip shape. The heater unit 140 may be disposed around the ice tray 110. For example, the heater unit 140 may contact the ice tray 110 under the ice tray 110. The heater unit 140 may include a pipe through which a heat medium flows. For example, the heater unit 140 may include heating wires that can generate heat from electric energy. However, the present disclosure is not limited to any specific configuration of the heater unit.

The duct 130 may have separation walls 150 extending in the longitudinal direction, e.g., in a pair. An internal space of the duct 130 may be divided by the separation walls 150. For example, the internal space of the duct 130 may be divided into a central space (first space) 134 traversing between the separation walls 150, and lateral spaces (second spaces) 135 located at the transverse outer sides of the separation walls 150. In other words, the central space 134 may be located between the lateral spaces 135. Cold air supplied to the duct 130 may flow through the central space 134. The heater unit 140 may be disposed in the lateral spaces 135. Thus, the space through which the cold air flows and the spaces accommodating the heater unit 140 may be separated by the separation walls 150. The separation walls 150 can reduce heat exchange between cold air in the duct 130 and the heater unit 140.

Each of the separation walls 150 may include a first separation wall 151 and a second separation wall 152. The first separation wall 151 may protrude downward (or outward) from the lower surface of the ice tray 110. The second separation wall 152 may protrude upward (or inward) from the bottom of the duct 130. The second separation wall 152 may be formed in the duct member 131. The first separation wall 151 and the second separation wall 152 may be disposed adjacent to each other and may be spaced apart by a predetermined distance. For example, two first separation walls 151 may be disposed between two second separation walls 152 and may be spaced apart from the two second separation walls 152. Thus, a predetermined gap may be formed between the first separation wall 151 and the second separation wall 152. Furthermore, at least a portion of the first separation wall 151 may overlap with the second separation wall 152 in the height direction of the ice tray 110. In other words, the first separation wall 151 may extend downward beyond the upper end of the second separation wall 152.

Furthermore, ribs 160 may be provided in the duct 130. The ribs 160 may be disposed in the central space 134 of the duct 130 and may be formed to protrude downward (or outward) from the lower surface of the ice tray 110. The ribs 160 may be formed in a bent shape. The ribs 160 having a bent shape may advantageously increase the contact area between the ice tray 110 and the cold air and may enhance the efficiency of heat transfer between the ice tray 110 and the cold air. Many of the ribs 160 may be provided.

The ice-storing unit 200 includes an ice storage part 210 and an ice discharge part 220.

The ice storage part 210 is configured to receive the ice pieces produced in the ice tray 110. The ice pieces may be delivered from the ice tray 110 to the ice storage part 210 by the ice-releasing member 112. The ice storage part 210 may be a container capable of accommodating the ice pieces. The ice storage part 210 may receive cold air from the cooling unit. The ice storage part 210 may be, for example, a container with an open upper surface.

The ice discharge part 220 may discharge the ice pieces stored in the ice storage part 210 to the outside. The ice discharge part 220 may include a delivery member 221 and a drive device 222. If the delivery member 221 is rotated by the drive device 222, the ice pieces around the delivery member 221 may fall toward the dispensing outlet of the ice-making device 30, thereby dispensed to a user.

Hereinafter, the exemplary operations and functions of the ice-making device 30 for a refrigerator configured as above are described. Once water is introduced into the ice tray 110 from the outside, it can freeze into ice pieces by the cold air passing through the duct 130. According to embodiments of the present disclosure, the uneven portions 120 are formed on the lower surface of the ice tray 110, and the ribs 160 are formed in the portion of the duct 130 through which the cold air passes. Thus, the contact area and contact time between the cold air passing through the duct 130 and the ice tray 110 is increased and the heat transfer efficiency is advantageously enhanced. The cold air mainly flows through the central space 134 of the duct 130.

After water in the ice tray 110 is completely turned into ice pieces, the ice pieces may be fed to the ice storage part 210. When the ice pieces are removed from the ice tray 110, the ice-releasing member 112 and the heater unit 140 may be enabled. For example, the heater unit 140 may heat the ice tray 110 prior to releasing the ice pieces. The portions of the ice pieces making contact with the ice tray 110 may be melted by the heat generated from the heater unit 140. Thereafter, the ice-releasing member 112 is driven to discharge the ice pieces from in the ice tray 110 to the outside. Due to the heat from the heater unit 140, the ice-releasing member 112 may easily discharge the ice pieces existing in the ice tray 110 to the outside of the ice tray 110.

The ice pieces fed to the ice storage part 210 may be kept cold by the cold air supplied from the cooling unit. The cold air may be discharged from the outflow portion 133 of the duct 130 and may be supplied to the ice pieces.

Although exemplary embodiments of the present disclosure are described above with reference to the accompanying drawings, those skilled in the art will understand that the present disclosure may be implemented in various ways without departing from the spirit of the present disclosure.

Therefore, it should be understood that the exemplary embodiments described above are not intended to be limiting, but only exemplary. The scope of the present disclosure is expressed by claims below, not the detailed description, and it should be construed that all changes and modifications achieved from the meanings and scope of claims and equivalent concepts are included in the scope of the present disclosure.

From the foregoing, it will be appreciated that various drawings of the present disclosure have been described herein for purposes of illustration, and that various modifications may be made without departing from the scope and spirit of the present disclosure. The exemplary embodiments disclosed in the specification of the present disclosure do not limit the present disclosure. The scope of the present disclosure will be interpreted by the claims below, and it will be construed that all techniques within the scope equivalent thereto belong to the scope of the present disclosure.

What is claimed is:

1. An ice-making device for a refrigerator, the ice-making device comprising:
    an ice tray configured to receive water therein and convert the water to ice pieces, the ice tray comprising a lower surface;
    a duct located under the ice tray and configured to receive a cold air from an evaporator and provide a flow path for cold air supplied from the evaporator to flow under the ice tray; and
    ribs protruding outward from the lower surface of the ice tray,
    wherein the lower surface of the ice tray comprises uneven portions extending in a direction different from a lengthwise direction of the ice tray,
    the ribs are continuously extended in a wavy shape along the lengthwise direction of the ice tray,
    the duct comprises at least two separation walls extending along the lengthwise direction of the ice tray,
    each of the separation walls includes a first separation wall protruding downward from the lower surface of the ice tray, and
    the uneven portions are provided between the ribs and between the rib and the first separation wall.

2. The ice-making device of claim 1, wherein the uneven portions protrude outward from the lower surface of the ice tray.

3. The ice-making device of claim 1, wherein the uneven portions include a recess portion depressed inward from the lower surface of the ice tray.

4. The ice-making device of claim 1, wherein the ice tray comprises partition walls and ice cells divided by the partition walls, and
    wherein the uneven portions comprise a plurality of uneven portions disposed at a portion corresponding to one of the ice cells.

5. The ice-making device of claim 1, wherein the duct comprises a bottom surface formed in a wavy shape,
    wherein the bottom surface allows the cold air passing through the duct to flow up and down.

6. The ice-making device of claim 1, further comprising:
    a heater unit disposed on an outer surface of the ice tray and configured to heat the ice tray,
    wherein the separation walls are configured to divide the duct into a first space and second spaces disposed at transverse outer sides of the first space, and
    wherein the heater unit is disposed in the second spaces.

7. The ice-making device of claim 6, wherein each of the separation walls further comprises a second separation wall,
    wherein the second separation wall protrudes upward from a bottom surface of the duct and is disposed adjacent to the first separation wall.

8. The ice-making device of claim 7, wherein the second separation wall is disposed inward of the first separation wall and spaced apart from the first separation wall by a predetermined distance, and
    wherein at least a portion of the first separation wall overlaps with the second separation wall in a vertical direction of the ice tray.

9. A refrigerator comprising:
    an evaporator; and
    an ice-making device comprising:
        an ice tray configured to receive water therein and convert the water to ice pieces, the ice tray comprising a lower surface;
        a duct located under the ice tray and configured to receive a cold air from an evaporator and provide a flow path for cold air supplied from the evaporator to flow under the ice tray; and
        ribs protruding outward from the lower surface of the ice tray,
    wherein the lower surface of the ice tray comprises uneven portions extending in a direction different from a lengthwise direction of the ice tray,
    the ribs extend in a bent shape along the lengthwise direction of the ice tray,
    the duct comprises at least two separation walls extending along the lengthwise direction of the ice tray,
    the separation walls include a first separation wall protruding downward from the lower surface of the ice tray, and
    the uneven portions are provided between the ribs and between the rib and the first separation wall.

10. The refrigerator of claim 9, wherein the duct comprises a bottom surface formed in a wavy shape.

11. The refrigerator of claim 9, wherein the uneven portions include a recess portion depressed inward from the lower surface of the ice tray.

12. The refrigerator of claim 9, wherein the uneven portions protrude outward from the lower surface of the ice tray.

13. The refrigerator of claim 9, wherein the ice tray comprises partition walls and ice cells divided by the partition walls, and
    wherein multiple uneven portions are provided at a portion corresponding to one of the ice cells.

14. The refrigerator of claim 13, further comprising:
    a heater unit disposed on an outer surface of the ice tray and configured to heat the ice tray,
    wherein the separation walls are configured to divide the duct into a first space and second spaces disposed at transverse outer sides of the first space, and
    wherein the heater unit is disposed in the second spaces.

15. The ice-making device of claim 14, wherein each of the separation walls further comprises a second separation wall,
   wherein the second separation wall protrudes upward from a bottom surface of the duct and is disposed adjacent to the first separation wall.

16. The ice-making device of claim 15, wherein the second separation wall is disposed inward of the first separation wall and spaced apart from the first separation wall by a predetermined distance, and
   wherein at least a portion of the first separation wall overlaps with the second separation wall in a vertical direction of the ice tray.

* * * * *